(12) United States Patent
Narayanan et al.

(10) Patent No.: US 11,816,901 B2
(45) Date of Patent: Nov. 14, 2023

(54) MULTI-AGENT TRAJECTORY PREDICTION

(71) Applicant: NEC Laboratories America, Inc., Princeton, NJ (US)

(72) Inventors: Sriram Nochur Narayanan, San Jose, CA (US); Buyu Liu, Cupertino, CA (US); Ramin Moslemi, Pleasonton, CA (US); Francesco Pittaluga, Los Angeles, CA (US); Manmohan Chandraker, Santa Clara, CA (US)

(73) Assignee: NEC Corporation

( * ) Notice: Subject to any disclaimer, the term of this patent is extended or adjusted under 35 U.S.C. 154(b) by 287 days.

(21) Appl. No.: 17/187,157

(22) Filed: Feb. 26, 2021

(65) Prior Publication Data
US 2021/0276547 A1 Sep. 9, 2021

Related U.S. Application Data

(60) Provisional application No. 62/984,802, filed on Mar. 4, 2020.

(51) Int. Cl.
*G06V 20/56* (2022.01)
*B60W 60/00* (2020.01)
(Continued)

(52) U.S. Cl.
CPC ......... *G06V 20/56* (2022.01); *B60W 30/0953* (2013.01); *B60W 30/0956* (2013.01);
(Continued)

(58) Field of Classification Search
CPC ..... B60W 2420/42; B60W 2554/4045; B60W 30/0953; B60W 30/0956; B60W 60/0027;
(Continued)

(56) References Cited

U.S. PATENT DOCUMENTS

| | | | | |
|---|---|---|---|---|
| 5,474,453 A | * | 12/1995 | Copperman | .......... A63F 13/497 434/69 |
| 2004/0088392 A1 | * | 5/2004 | Barrett | ................. G08G 1/0104 709/223 |

(Continued)

OTHER PUBLICATIONS

Amirian, J. et al., "Learning Multi-modal Distributions of Pedestrian Trajectories with GANs", The IEEE Conference on Computer Vision and Pattern Recognition (CVPR) Workshops. Jun. 2019.

(Continued)

*Primary Examiner* — Fadey S. Jabr
*Assistant Examiner* — Michael J Herrera
(74) *Attorney, Agent, or Firm* — Joseph Kolodka

(57) ABSTRACT

Methods and systems for training a trajectory prediction model and performing a vehicle maneuver include encoding a set of training data to generate encoded training vectors, where the training data includes trajectory information for agents over time. Trajectory scenarios are simulated based on the encoded training vectors, with each simulated trajectory scenario representing one or more agents with respective agent trajectories, to generate simulated training data. A predictive neural network model is trained using the simulated training data to generate predicted trajectory scenarios based on a detected scene.

6 Claims, 6 Drawing Sheets

(51) Int. Cl.
G06N 3/08 (2023.01)
G06F 18/214 (2023.01)
B60W 30/095 (2012.01)
G06V 10/82 (2022.01)

(52) U.S. Cl.
CPC ....... *B60W 60/0027* (2020.02); *G06F 18/214* (2023.01); *G06N 3/08* (2013.01); *G06V 10/82* (2022.01); *B60W 2420/42* (2013.01); *B60W 2554/4045* (2020.02)

(58) Field of Classification Search
CPC . G06F 18/214; G06F 18/24137; G06N 3/044; G06N 3/045; G06N 3/08; G06N 3/084; G06V 10/82; G06V 20/56
See application file for complete search history.

(56) References Cited

U.S. PATENT DOCUMENTS

| | | | | |
|---|---|---|---|---|
| 2004/0176936 | A1* | 9/2004 | Ohtsu | G09B 19/167 703/8 |
| 2014/0278052 | A1* | 9/2014 | Slavin | G01C 21/3492 701/400 |
| 2018/0124423 | A1* | 5/2018 | Choi | G06V 10/82 |
| 2018/0141544 | A1* | 5/2018 | Xiao | G05D 1/0212 |
| 2018/0194354 | A1* | 7/2018 | Takeda | B60W 30/14 |
| 2019/0095731 | A1* | 3/2019 | Vernaza | G06F 18/214 |
| 2019/0111933 | A1* | 4/2019 | Schoeggl | B60W 30/18163 |
| 2019/0129831 | A1* | 5/2019 | Goldberg | G06F 3/04847 |
| 2019/0163182 | A1* | 5/2019 | Li | G05D 1/0027 |
| 2019/0212749 | A1* | 7/2019 | Chen | G06N 20/00 |
| 2019/0287404 | A1* | 9/2019 | Vernaza | G08G 1/0145 |
| 2019/0384304 | A1* | 12/2019 | Towal | G06N 3/08 |

OTHER PUBLICATIONS

Caesar, H. et al., "nuscenes: A Multimodal Dataset for Autonomous Driving", arXiv preprint arXiv:1903.11027. Mar. 26, 2019, pp. 1-16.
Chandra, R. et al., "TraPHic: Trajectory Prediction in Dense and Heterogeneous Traffic Using Weighted Interactions", Proceedings of the IEEE Conference on Computer Vision and Pattern Recognition. Jun. 2019, pp. 8483-8492.
Chang, M.F. et al., "Argoverse: 3D Tracking and Forecasting with Rich Maps", In: The IEEE Conference on Computer Vision and Pattern Recognition (CVPR). Jun. 2019, pp. 8748-8757.
Deo, N. et al., Convolutional Social Pooling for Vehicle Trajectory Prediction, CoRR abs/1805.06771 (2018), http://arxiv.org/abs/1805.06771. May 15, 2018, pp. 1-9.
Dosovitskiy, A. et al., "CARLA: An Open Urban Driving Simulator", Proceedings of the 1st Annual Conference on Robot Learning. Oct. 18, 2017, pp. 1-16.
Firl, J. et al., "Predictive Maneuver Evaluation for Enhancement of Car-to-x Mobility Data", 2012 IEEE Intelligent Vehicles Symposium. https://doi.org/10.1109/IVS.2012.6232217. Jun. 2012, pp. 558-564.
Gaidon, A. et al., "Virtual Worlds as Proxy for Multi-object Tracking Analysis", CoRR abs/1605.06457 (2016), http://arxiv.org/abs/1605.06457. May 20, 2016, pp. 1-10.
Geiger, A. et al., "Vision meets robotics: The Kitti Dataset", International Journal of Robotics Research (IJRR). Sep. 2013, pp. 1231-1237.
Gupta, A. et al., "Social GAN: Socially Acceptable Trajectories with Generative Adversarial Networks", 2018 IEEE/CVF Conference on Computer Vision and Pattern. Recognition. https://doi.org/10.1109/CVPR.2018.00240. Jun. 2018, pp. 2255-2264.
Hong, J. et al., "Rules of the Road: Predicting Driving Behavior with a Convolutional Model of Semantic Interactions", The IEEE Conference on Computer Vision and Pattern Recognition (CVPR). Jun. 2019, pp. 8454-8462.
Ivanovic, B. et al., "The trajectron: Probabilistic Multi-agent Trajectory Modeling with Dynamic Spatiotemporal Graphs", InProceedings of the IEEE/CVF International Conference on Computer Vision. Oct. 2019, pp. 2375-2384.
Johnson-Roberson, M. et al., "Driving in the Matrix: Can Virtual Worlds Replace Human-generated Annotations for Real World Tasks?", CoRR abs/1610.01983, http://arxiv.org/abs/1610.01983. Oct. 6, 2016, pp. 1-8.
Kalman, R.E., "A New Approach to Linear Filtering and Prediction Problems", Journal of basic Engineering. Mar. 1960, pp. 1-12.
Kitani, K.M. et al., "Activity forecasting", European Conference on Computer Vision, Springer. Oct. 7, 2012, pp. 201-214.
Kosaraju, V. et al., "Social-bigat: Multimodal Trajectory Forecasting Using Bicycle-GAN and Graph Attention Networks", CoRR abs/1907.03395, http://arxiv.org/abs/1907.03395. Jul. 4, 2019, pp. 1-10.
Lee, N. et al., "Desire: Distant Future Prediction in Dynamic Scenes with Interacting Agents", 2017 IEEE Conference on Computer Vision and Pattern Recognition (CVPR). Jul. 2017, pp. pp. 336-345.
Leurent, E., "A Minimalist Environment for Decision-making in Autonomous Driving", https://github.com/eleurent/highway-env. Sep. 7, 2020.
Li, Y., "Which Way Are You Going? Imitative Decision Learning for Path Forecasting in Dynamic Scenes", Proceedings of the IEEE Conference on Computer Vision and Pattern Recognition. Jun. 2019, pp. 294-303.
Ma, Y. et al., "Trafficpredict: Trajectory Prediction for Heterogeneous Traffic-agents", arXiv preprint arXiv:1811.02146. Jul. 17, 2018, pp. 6120-6127.
Rasmussen, C.E. et al., "Gaussian Processes for Machine Learning", (Adaptive Computation and Machine Learning). The MIT Press. Jul. 2005, pp. 1019-1041.
Rhinehart, N. et al., "R2P2: A Reparameterized Pushforward Policy for Diverse, Precise Generative Path Forecasting", The European Conference on Computer Vision (ECCV). Sep. 2018, pp. 1-17.
Ronneberger, O. et al., "U-net: Convolutional Networks for biomedical Image segmentation", Medical Image Computing and Computer-Assisted Intervention MICCAI, https://doi.org/10.1007/978-3-319-24574-428. Oct. 5, 2015, pp. 1-8.
Ros, G. et al., "The SYNTHIA Dataset: A Large Collection of Synthetic Images for Semantic Segmentation of Urban Scenes", Jun. 2016, pp. 3234-3243.
Sadeghian, A. et al., "SoPhie An Attentive GAN for Predicting Paths Compliant to Social and Physical Constraints", CoRRabs/1806.01482, http://arxiv.org/abs/1806.01482. Jun. 5, 2018, pp. 1-9.
Shah, S. et al., "AirSim High-Fidelity Visual and Physical Simulation for Autonomous Vehicles", CoRR abs/1705.05065, http://arxiv.org/abs/1705.05065. May 15, 2017, pp. 1-14.
Sohn, K. et al., "Learning Structured Output Representation Using Deep Conditional Generative Models", Advances in Neural Information Processing Systems. Dec. 2015, pp. 1-9.
Srikanth, S. et al., "INFER: INtermediate representations for FuturE pRediction", 2019 IEEE/RSJ International Conference on Intelligent Robots and Systems (IROS), https://doi.org/10.1109/iros40897.2019.8968553. Nov. 2019, pp. 1-9.
Sriram, N.N. et al., "A Hierarchical Network for Diverse Trajectory Proposals", 2019 IEEE Intelligent Vehicles Symposium (IV), https://doi.org/10.1109/IVS.2019.8813986. Jun. 2019, pp. 689-694.
Treiber, M. et al., "Congested Traffic States in Empirical Observations and Microscopic Simulations", Physical review. Aug. 1, 2000, pp. 1-47.
Treiber, M. et al., "Modeling Lane-changing Decisions with MOBIL", InTraffic and Granular Flow '07, Springer Berlin Heidelberg, Berlin, Heidelberg. Oct. 2008, pp. 211-221.
Xingjian, S. et al., "Convolutional LSTM Network: A Machine Learning Approach for Precipitation Nowcasting", Advances in neural information processing systems. Jun. 13, 2015, pp. 1-12.
Zhao, T. et al., "Multi-agent Tensor Fusion for Contextual Trajectory Prediction", The IEEE Conference on Computer Vision and Pattern Recognition (CVPR). Jun. 2019, pp. 12126-12134.

(56) References Cited

OTHER PUBLICATIONS

Kingma, D.P. et al., "Adam: A Method for Stochastic Optimization", arXiv preprint arXiv:1412.6980. Dec. 22, 2014, pp. 1-15.

* cited by examiner

MULTI-AGENT TRAJECTORY PREDICTION

RELATED APPLICATION INFORMATION

This application claims priority to U.S. Patent Application No. 62/984,802, filed on Mar. 4, 2020, incorporated herein by reference entirety.

BACKGROUND

Technical Field

The present invention relates to vehicle path prediction, and, more particularly, to the prediction of multiple vehicle agents in a single scene.

Description of the Related Art

With the growing prevalence of autonomous vehicles, there is a growing need for automatically identifying the trajectories of vehicles on the road, to aid in collision avoidance. As the number of vehicles in a scene increases, the complexity of predicting all of the vehicles' trajectories increases dramatically.

SUMMARY

A method for training a trajectory prediction model includes encoding a set of training data to generate encoded training vectors, where the training data includes trajectory information for agents over time. Trajectory scenarios are simulated based on the encoded training vectors, with each simulated trajectory scenario representing one or more agents with respective agent trajectories, to generate simulated training data. A predictive neural network model is trained using the simulated training data to generate predicted trajectory scenarios based on a detected scene.

A method for performing a vehicle maneuver includes detecting a scene with a multiple agents. A predicted trajectory scenario is generated based on the detected scene, using a predictive model. The predictive model generates trajectories for all of the agents at once. A safe maneuver is determined based on the predicted trajectory scenario. A vehicle is controlled to perform the safe maneuver.

A system for performing a vehicle maneuver includes a vehicle control system that causes the vehicle to perform a maneuver in response to an instruction, a sensor that detects a scene with multiple agents, a hardware processor, and a memory that stores computer program code. When the program code is executed by the hardware processor, it causes the hardware processor to generate a predicted trajectory scenario based on the detected scene, using a predictive model, to determine a safe maneuver based on the predicted trajectory scenario, and to issue an instruction to the vehicle control system to perform the safe maneuver. The predictive model generates trajectories for all of the plurality of agents at once.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

To predict the trajectories of vehicles within a scene, paths may be predicted for multiple agents at the same time, with a time complexity of $O(1)$, indicating that the computational complexity does not increase with the number of vehicles. Additionally, training data may be generated by simulating vehicle motion to create realistic pseudo-trajectories, where models trained using the pseudo-trajectories yield better results than models trained solely on real data. The simulated trajectories improve the diversity of the training data and capture scenarios that may occur rarely in recorded training data.

Paths may be predicted using a deep machine learning model that uses a single representation to model all of the agents in the scene. A combination of convolutional long-short term memory (LSTM) units and state pooling ensures that each vehicle maintains some information about what it has predicted in the past.

Figure 1:
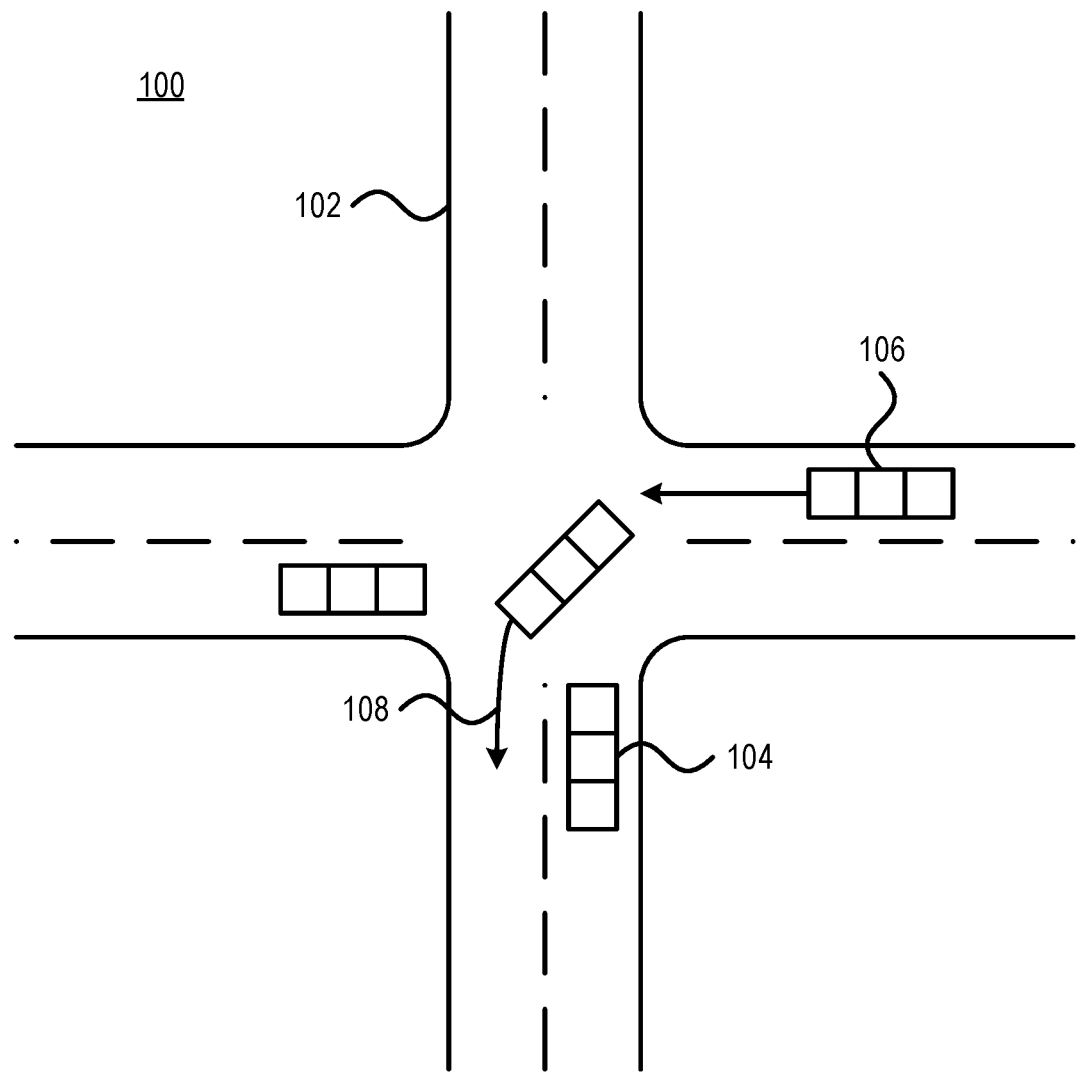
FIG. 1 is a diagram illustrating a scene with multiple vehicle trajectories, in accordance with an embodiment of the present invention.

Referring now to FIG. 1, an exemplary driving scene 100 is shown. The scene 100 depicts an intersection of four roads 102, with four vehicles, including one decision-making vehicle 104 and three agent vehicles 106. The scene 100 includes trajectories 108 that are predicted for the agent vehicles 106. The decision-making vehicle 104 uses these predicted trajectories 108 to make decisions as to how it will proceed.

The decision-making vehicle 104 may predict multiple plausible trajectories for the other vehicles 106, with the trajectories being consistent with the scene semantics. For example, the scene may encode information about barriers and the physical properties of the scene to ensure that the predicted trajectories are physically possible. The decision-making vehicle 104 may further perform these predictions in real-time, regardless of the number of agent vehicles 106 it may encounter. This real-time operation is important in realistic scenarios, where split-second decisions may make the difference in avoiding a collision.

To train a machine learning system to handle such scenarios, training data that features actual trajectories of the agent vehicles 106 may be used. Various scenes may be included, with different agent vehicles 106 in various positions, and with their respective trajectories being provided. However, real-life training data may be relatively sparse, and may not cover all of the potential scenes that the decision-making vehicle 104 may encounter.

The real-world training data may therefore be augmented with simulated training data, for example by generating multiple driving behaviors to produce diverse trajectories from a given scene. Toward that end, a graph-based simulation environment may be used to leverage scene semantics and to map realistic vehicle behaviors. Reference velocity profiles may be sampled from trajectories executing similar maneuvers in the real-world data. The dynamics of vehicle driving patterns may be modeled with lane-change decisions. Predictive models that are trained using such a simulated training dataset provides a substantial improvement in prediction outcomes, as compared to models that are trained on real-world data, which are comparatively limited in both the amount and the diversity of their training data.

Figure 2:
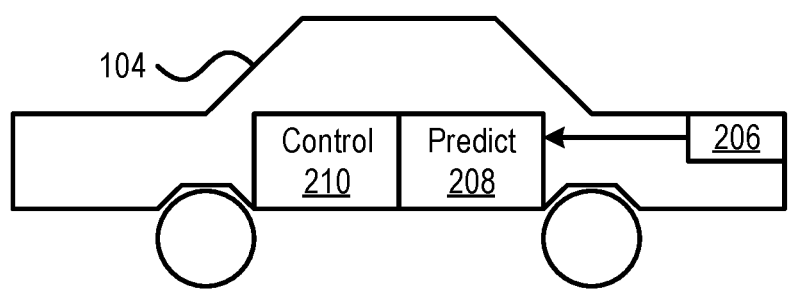
FIG. 2 is a diagram of a self-driving vehicle, in accordance with an embodiment of the present invention.

Referring now to FIG. 2, additional detail is provided on the decision-making vehicle 104. The vehicle 104 includes one or more sensors 206 that provide information about a scene. These sensors 206 may collect any appropriate information, such as visual information, light detection and ranging (LIDAR) information, sound navigation and ranging (SONAR) information, and/or radio detection and ranging (RADAR). The sensors 206 may furthermore collect data from the decision-making vehicle 104 itself, such as speed and trajectory.

Information from the sensor(s) 206 is provided to a trajectory prediction system 208, which may include a predictive model. The predictive model 208 identifies agent vehicles 104 in the scene and makes predictions about their trajectories. This trajectory information is provided to control system 210.

The control system 210 uses the information from the sensors 206 and the predicted trajectories from the predictive model 208 to control the motion of the decision-making vehicle 104. Exemplary controls may include a servo that automatically changes the direction of wheels, or a control on the throttle that increases the vehicle's speed, or a control on the brake that decreases the vehicle's speed. The control system 210 may further provide auditory and/or visual alerts, such as by sounding the vehicle's horn, playing a sound via a speaker, flashing the vehicle's headlights, and providing information to a driver of the vehicle.

The input to the control system 210 may include maneuver identification, to produce state changes for the decision-making vehicle 104. The control system 210 may include longitudinal and lateral controllers that provide velocity commands. Lane centerlines may be used as a reference trajectory for the control system 210 to follow, with a velocity from the lateral controller being converted to steering commands that help to track the reference trajectory.

With v as the current velocity of the decision-making vehicle 104, $x_{lateral}$ may be the lateral position from the lane centerline, with $v_{lateral}$ being the lateral velocity. A steering angle $\phi$ may be obtained through the following:

$$v_{lateral} = -kp_{lateral}(x_{lateral} + \epsilon)$$

$$\psi_{req} = \arcsin\left(\frac{v_{lateral}}{v}\right)$$

$$\psi_{ref} = \psi_{future} + \psi_{req}$$

-continued $$\dot{\psi} = kp_{heading}\psi_{ref}$$

$$\phi = \arctan\left(\frac{L}{v}\dot{\psi}\right)$$

where $kp_{lateral}$ and $kp_{heading}$ are controller parameters, L represents the length of the vehicle, $\epsilon$ acts as an offset noise in tracking the lane, $\psi_{req}$ is a heading that needs to be compensated for to align to the lane center, and $\psi_{future}$ is a heading that needs to be achieved in future time steps. A heading controller provides a heading rate of $\dot{\psi}$ for the given reference heading $\psi_{ref}$.

Figure 3:
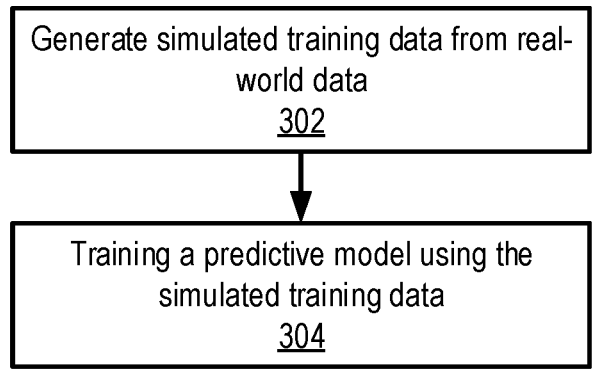
FIG. 3 is a block/flow diagram of a method for training a predictive vehicle trajectory model, in accordance with an embodiment of the present invention.

Referring now to FIG. 3, a method of training the predictive model 208 is shown. Block 302 generates simulated training data that is based on real-world data. Block 304 then uses the simulated training data to train the predictive model 208. The training of block 304 may be performed using solely the simulated training data, or may include both simulated training data and real-world training data. It should be noted that, although the present embodiments are specifically described with respect to a context where a self-driving vehicle predicts the trajectories of other vehicles, the present principles may be extended to any form of trajectory prediction in any appropriate context.

The predictive model 208 may include convolutional long-short term memory (LSTM) layers and conditional variational autoencoders (CVAEs). Agent states and scene context may be represented in the training data as a two-dimensional top-down view. For a given scene input, the predictive model 208 may be trained to generate trajectories for n agents. The top-view grid map representation of the agents 104 and the decision-making vehicle 104 in the scene may be combined with fully convolutional operations to model output predictions.

Autoencoder networks may include two sections: an encoder section and a decoder section. The encoder section may create a relatively low-dimensional embedding of a relatively high-dimensional input, while the decoder section may recreate the original high-dimensional input. The autoencoder network is trained to recreate the original input as closely as possible. Such networks may be used in various ways. For example, the low-dimensional embedding may be used as a relatively compact representation of the original input. The high-dimensional output, meanwhile, may be used to reconstruct information from a noisy input. The predictive model 208 may be implemented as an artificial neural network, as described below.

The multiple agents are modeled with state pooling operations, to implicitly account for interactions among objects and to handle dynamically changing scenarios. To obtain multimodal predictions, labels may be assigned to trajectories, based on the type of maneuver that they execute. Block 302 may use this label to capture diversity in the types of maneuvers that are executed.

The distance before taking a turn is highly correlated to average velocity. The average velocity decreases while making approaching an intersection with the intention of making a turn. As a result, the distance to the intersections is also a useful feature that may be extracted and used to mimic real-world data for simulations in block 302. Velocity profiles from real-world data may be labeled with a value of distance before a turn or average velocity, for turning maneuvers and straight maneuvers respectively. The velocity profile may include a series of vehicle velocities at every time step for the simulation period. A nearest neighbor velocity profile may be identified in the real-world data using these features with the values from the simulated vehicle. The identified velocity profile may then be used as a reference for the simulated vehicle at each time step. Gaussian noise with a mean of zero and with unit variance may furthermore be added to increase the diversity in the sampled velocity profiles.

Figure 4:
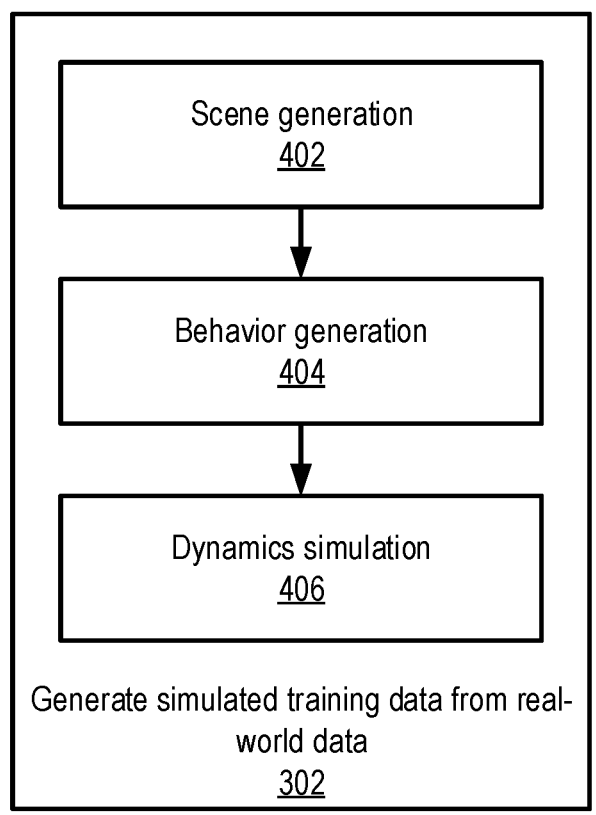
FIG. 4 is a block/flow diagram of a method for generating simulated training data for multi-agent scenarios, in accordance with an embodiment of the present invention.

Referring now to FIG. 4, additional detail on generating the simulated training data in block 302 is shown. Scene generation 402 takes as input lane centerline information, for example as a representation of the roads in a scene. This information can be provided by a training dataset, or may be extracted from available map information. Scene generation 402 may also include a number of lanes and an indication of one-way roads for each road segment. Every bi-directional road centerline may be split based on the number of lanes and one-way information. Scene generation 402 uses this information to generate, for example, a graph data structure that includes nodes and edges. The nodes represent end points of a lane and the edges represent the lane centerline. This scene graph may also be expressed as a top-down view of the scene.

Scene generation further instantiates objects within the scene graph, for example by defining a coordinate system with respect to the decision-making vehicle 104 and by identifying a nearest edge that is occupied by the objects in the scene graph.

Behavior generation 404 identifies possible maneuvers that each object in the scene can perform, given traffic conditions and road structure. Different vehicle behaviors may be uniformly sampled. These behaviors, as they apply to vehicles, may include maneuvers like, "forward motion," "left turn," "right turn," and "lane change." To execute such diverse behaviors in a way that is realistic, velocity profiles may be sampled from real datasets as a reference for the intended behavior that an agent vehicle 106 is going to execute. This reference velocity may be used to execute the correct behavior for each agent vehicle 106, taking into account the scene layout and current traffic conditions to provide a safe acceleration that the decision-making vehicle 104 can execute.

Each scene may be simulated in this manner for a predetermined period of time, with a set of diverse behaviors being generated. For example, a simulation may be generated for seven seconds, with an exemplary maximum of three behaviors. The output may include a set of vehicle stated $\{x, v, \psi, a, \phi\}_1^T$, which may represent position, velocity, heading, acceleration, and steering over the course of the simulation.

Thus, given a particular lane identifier (e.g., a node in the scene graph) for every vehicle, behavior generation 404 may perform a depth-first search for K possible leaf nodes that can be reached within a threshold distance. Plausible maneuvers may be categorized for each node into different categories, such as, "left," "right," and, "straight." Before performing the simulation, a pool of reference velocity profiles may be generated from real-world data. At the time of simulation, after sampling a behavior, a nearest neighbor velocity profile for the current scene may be obtained, based on features such as distance before a turn and average velocity.

Dynamics simulation 406 uses the scene graph, a behavior from the pool of diverse plausible behaviors, and a reference velocity for the appropriate behavior. Acceleration and lane change decisions generated by dynamics simulation 404 are fed to the control 210 that tracks and exhibits appropriate state changes in vehicle behavior. A distance to a leading vehicle s, an actual velocity v of the decision-making vehicle 104, and a velocity difference Δv between the leading vehicle and the decision-making vehicle are used as inputs, and an output acceleration a is provided as being safe for the current traffic predictions. This value may be generated as:

$$a(s, v, \Delta v) = a\left(1 - \left(\frac{v}{v_0}\right)^\delta - \left(\frac{s^*(v, \Delta v)}{s}\right)^2\right)$$

where $v_0$ is the reference velocity and $\delta$ is an exponent that influences how acceleration decreases with velocity. The deceleration of the decision-making vehicle 104 depends on the ratio of the desired minimum gap s* to the actual bumper distance s from the leading vehicle.

Dynamics simulation 406 may also consider lane changing behavior, to add additional diversity in vehicle trajectories apart from turn-based maneuver trajectories. Parameters that control lane changing behavior may include a politeness factor p, which influences lane changing if there is an increase in acceleration for other agents, a lane changing threshold $\Delta a_{th}$, a maximum safe deceleration $b_{safe}$, and a bias for a particular lane $\Delta a_{bias}$. The following equations govern whether a lane change can be executed:

$$\tilde{a}_c - a_c + p\{(\tilde{a}_n - a_n) + (\tilde{a}_o - a_o)\} > \Delta a_{th} - \Delta a_{bias}$$

$$(\tilde{a}_n - a_n) > -b_{safe}^n, (\tilde{a}_c - a_c) > -b_{safe}^c$$

where a is the current acceleration and ã represents a new acceleration after lane change. The subscripts c, n, and o denote current, new vehicles, and old vehicles, respectively. If the first inequality not satisfied, then no lane change may be performed. If the first inequality is satisfied, but the second inequality is not, then again, no lane change may be performed. If both inequalities are satisfied, then a lane change may be performed.

Figure 5:
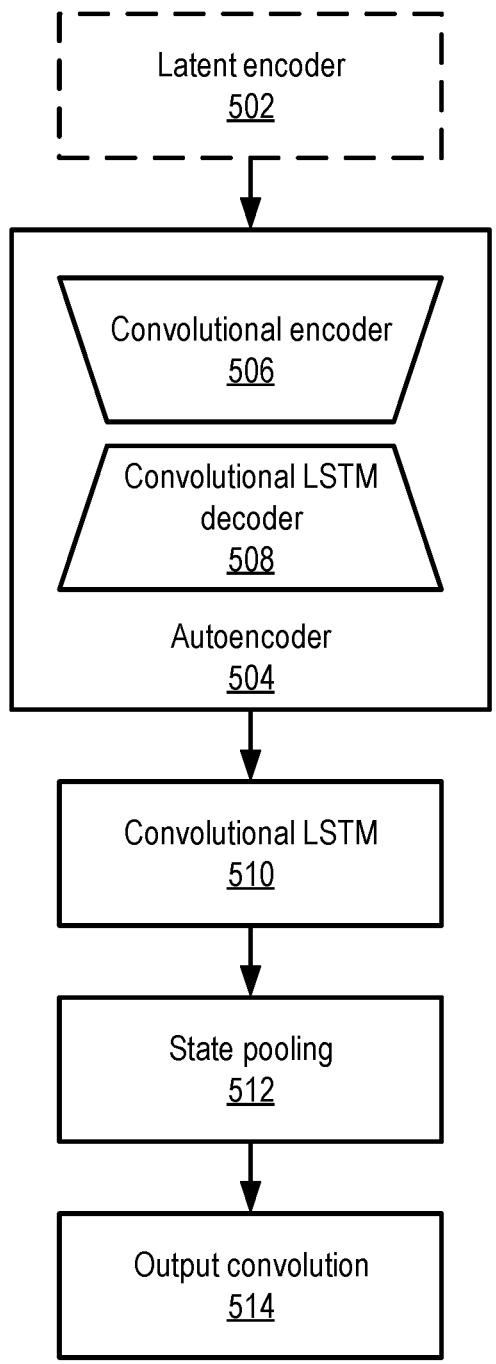
FIG. 5 is a block diagram of a predictive model for predicting trajectories of multiple vehicles, in accordance with an embodiment of the present invention.

Referring now to FIG. 5, detail on the predictive model 208 is shown. The predictive model may predict trajectories for multiple agent vehicles 104 in a road scene, such that the predictions are context aware, multimodal, and have constant inference time, regardless of the number of agents. The trajectory prediction problem may be formulated as a per-frame regression of agent locations over a spatial grid.

Given lane centerline information $L^1 \cdots ^m$ for a scene, where m number of different centerlines in the scene, the lanes may be rendered in a top-down representation, such that the scene context map $\mathcal{J}$ may have dimension H×W×3, where the channel dimension represents one-hot information of pixels that correspond to a road element that may be expressed as a tuple {road, lane, unknown}. The trajectory information of the $i^{th}$ vehicle may be expressed as $X_i=\{X_i^1, \ldots, X_i^T\}$, from timestep 1 to timestep T, where each $X_i^t=(x_i,y_i)^t$ represents the spatial location of the agent i at the $i^{th}$ timestep.

The predictive model 208 takes input in the form of relative coordinates $^RX_i$ with respect to an agent's starting location. For the $i^{th}$ agent in a scene, the relative coordinates $^RX_i$ may be projected at corresponding $X_i$ locations to construct a spatial location map of states $\mathcal{S}^1 \cdots ^T$, such that $\mathcal{S}^t[X_i^t]$ includes the relative coordinates of the $i^{th}$ agent at the timestep t. The ground truth trajectory may be expressed as ${}^R Y_i = {}^R X_i^{t_{obs} \cdots T}$, and the location mask representing the configuration of the agent vehicles 106 in the scene may be expressed as $\mathcal{M}^t$. A vehicle ID map $\mathcal{V}^{1 \cdots T}$ may be used to track vehicles across timesteps, where $\mathcal{V}^t[X_i^t] = i$. Each trajectory ${}^R X_i^{t_{obs} \cdots T}$ may be associated with a label $c_i$ that represents the behavioral type of the trajectory, for example selected from the options {straight, left, right}, with a trajectory label for lane changes falling into one of these categories. The grid map of $c_i$ may be represented as $\mathcal{C}$, such that $\mathcal{C}^t[X_i^t] = c_i$. The term $t_{obs}$ represents a particular time of observation, set between t=0 and t=T, marking the delineation between time steps that have already occurred and time steps where the trajectory will be predicted. Vehicle trajectories are not random. Instead, they depend on behaviors of other vehicles on the road.

The model may take previous states $\mathcal{S}^{1 \cdots t_{obs}}$ as input, along with the scene context map $\mathcal{J}$, trajectory label map $\mathcal{C}$, location mask $\mathcal{M}$, and a noise map $\mathcal{Z}$, to predict the future trajectories ${}^R \hat{Y}_i$ for every agent at its corresponding grid map location $X_i^t$ in the scene. Rather than having a separate head for each agent, the model may predict a single future state map $\hat{\mathcal{S}}^t$, where each individual agent attempts to match ${}^R \hat{Y}_i$ at each time step t.

During training, a latent encoder 502 performs recognition $Q_\phi$ for a CVAE framework. The latent encoder 502 takes past and future trajectory information ${}^R X_i$ from the training data, and passes them through an embedding layer. The embedded vectors are then encoded by an LSTM network at every timestep. The outputs across all the timesteps may be concatenated together into a single vector, along with the one-hot trajectory label $c_i$, to produce the output vector $V_{enc}(i)$. The output vector may then be processed by a multilayer perceptron (MLP) to obtain μ and σ to output a distribution $Q_\phi(z_i | {}^R X_i, c_i)$. Formally:

$${}^o h_i^t = LSTM(h_i^{t-1}, {}^R X_i^t)$$

$$V_{enc}(i) = [{}^o h_i^1, \ldots, {}^o h_i^T, c_i]$$

$$\mu, \sigma = MLP(V_{enc}(i))$$

where h represents hidden state vectors in the LSTM, μ is a mean and σ is a log variance of a latent distribution, and $z_i$ is the latent vector obtained from the inputs ${}^R X_i, c_i$. In one example, $z_i = e^{0.5\sigma} \in$ where $\in$ is a Gaussian noise vector. The latent encoder 502 may include an embedding layer and LSTM having 16 dimensions. A fully connected layer in the latent encoder 502 may have 512 and 128 units that produce 16-dimensional outputs μ and σ. For every time step in the LSTM, $h_i^{t-1}$ from a previous time step is passed to the next timestep to obtain updated hidden vectors $h_i^t$. The term ${}^o h_i^t$ represents the hidden vector of the last LSTM layer, with o indicating the final output of the LSTM layer.

At any time step t, the inputs to the autoencoder 504 include a scene context map $\mathcal{J}$ (dimension H×W×3), a single representation of all the current state $\mathcal{S}^t$ of all the agents in the scene (dimension H×W×2), a location mask $\mathcal{M}^t$ (dimension H×W×1), a one-hot trajectory-specific label for each agent projected at agent-specific locations in a grid from $\mathcal{C}^t$ (dimension H×W×3), and a latent vector map $\mathcal{Z}^t$ (dimension H×W×16) that includes $z_i$ obtained from $Q_\phi(z_i | {}^R X_i, c_i)$ during the training, or sampled from a prior distribution $P_v(z_i | {}^R X_i, c_i)$ at test time. The network input $E^t$ may be expressed as:

$$E^t = [\mathcal{J}, \mathcal{S}^t, \mathcal{M}^t, \mathcal{C}^t, \mathcal{Z}^t]$$

having a dimension of H×W×25 for each time step t. The encoder 504 may include six convolutional layers, with the first convolutional layer of the encoder 504 being a three-dimensional convolution, and with each subsequent convolutional layer of the encoder 504 being two-dimensional convolutions. The number of filters for each convolutional layer of the encoder 504 may be 16, 16, 32, 32, 64, and 64, respectively, with alternating strides of 1 and 2. The kernel size of the first convolutional layer of the encoder 504 may be 1×1×4, and the kernel size of the remaining convolutional layers of the encoder 504 may be 3×3.

At each time step, the inputs are applied to an encoder 506 of the autoencoder 504. The encoder 506 may include strided convolutions, which encode information in small dimensions. The output of the encoder 506 then passes to the decoder 508. The decoder 508 may include convolutional LSTMs and transposed convolutions, with skip connections from the encoder 506. The decoder 508 outputs a map having dimension H×W, which is passed to another convolutional LSTM layer 510, with state pooling 512. A final 1×1 convolutional layer 514 may be used to output a two-channel map that includes relative predicted coordinates ${}^R X_i^t$ for the agents in the next time step.

The decoder 508 may include alternating convolutional LSTM layers and two-dimensional transposed convolutional layers. The size of the hidden state or output filters in each pair of convolutional LSTM layers and transposed convolutions may be 64, 32, and 16, respectively. Convolutions may share a same kernel size of 3×3, with transposed convolutions having a stride of 2. Skip connections may be included from encoder layers 2 and 4, to corresponding second and third convolutional LSTM layers in the decoder 508.

During prediction (e.g., time steps $t_{obs} \ldots T$), the outputs may not be fed back directly as inputs to the network. Instead, the agents' states may be updated to the next location in the scene, based on predictions. The relative predicted output ${}^R \hat{X}_i^{t-1}$ may be updated to the absolute predicted location $\hat{X}_i^t$ to obtain an updated scene state map $\mathcal{S}^t$ that includes all of the updated locations of all agents in the scene. Using such representations for the scene is agnostic to the number of agents and, as the agents' next states are predicted, dynamic entry and exist of agents from the scene can be handled.

Multi-agent predictions may be realized through the state pooling 512. Whereas convolutional LSTMs could produce semantically aligned trajectories with erratic maneuvers, state pooling 512 ensures the availability of previous state information when trying to predict the next location. State pooling 512 pools the previous state information from the final layer in the convolutional LSTM 510 for all agents ${}^{sp} H_i^{t-1}$ and initializes the next state with ${}^{sp} H_i^{t-1}$ (for both hidden and cell states) at agents' updated locations, and with zero vectors at all other locations, for time step t. The convolutional LSTM 510 and the state pooling 512 may have a hidden state of sixteen channels with a 1×1 kernel size. Features from the first three-dimensional convolution may be concatenated before being provided to the convolutional LSTM 510.

During training, two loss functions may be used, including a reconstruction loss and a Kullback-Leibler divergence loss. The reconstruction loss penalizes the predictions to enable them to reconstruct the ground truth accurately, and may be expressed as $$\mathcal{L}_R = \frac{1}{N}\sum_i^N \|{}^R Y_i - {}^R \hat{Y}_i\|.$$

The Kullback-Leibler divergence loss regularizes the output distribution from $Q_\phi$ to match the sampling distribution $P_\nu$ at test time, and may be expressed as $$\mathcal{L}_{KLD} = D_{KL}(Q_\phi(z_i|{}^R X_i c_i) \| P_\nu(z_i|{}^R X_i, c_i)).$$

Figure 6:
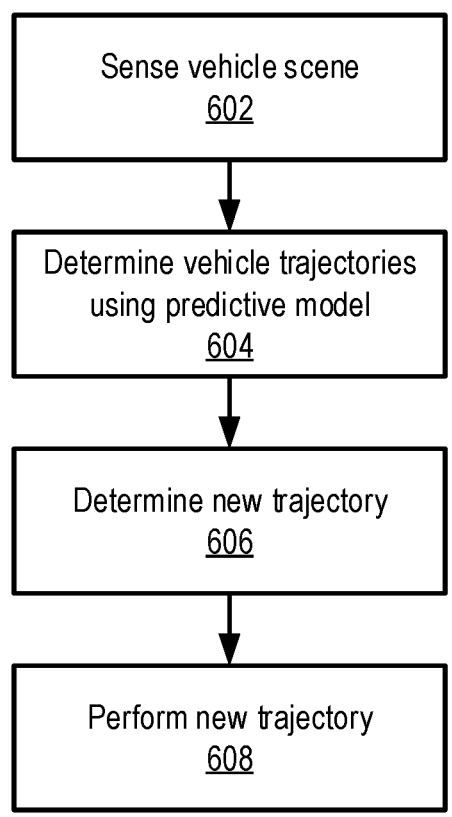
FIG. 6 is a block/flow diagram of a method for controlling a self-driving vehicle, in accordance with an embodiment of the present invention.

Referring now to FIG. 6, a method of steering a self-driving vehicle is shown. Block 602 senses the scene, for example using sensors 206 on the decision-making vehicle 104. These sensors 206 may identify information about the road, for example by providing a two-dimensional layout of the scene. The sensors 206 my further provide positional information for different vehicles within the scene.

Block 604 determines the trajectories of agent vehicles 106 within the scene, for example using the predictive model 208. The predicted trajectories identify where the sensed agent vehicles 106 will be in the future. Based on this information, block 606 determines a new trajectory for the decision-making vehicle 104. The new trajectory may take into account the motion of other nearby vehicles 106, and may further take into account terrain and other scene features, as well as safe acceleration/deceleration speeds. Block 608 then performs the determined trajectory, for example using the control system 210 to adjust the steering and acceleration/braking of the decision-making vehicle 104.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 7:
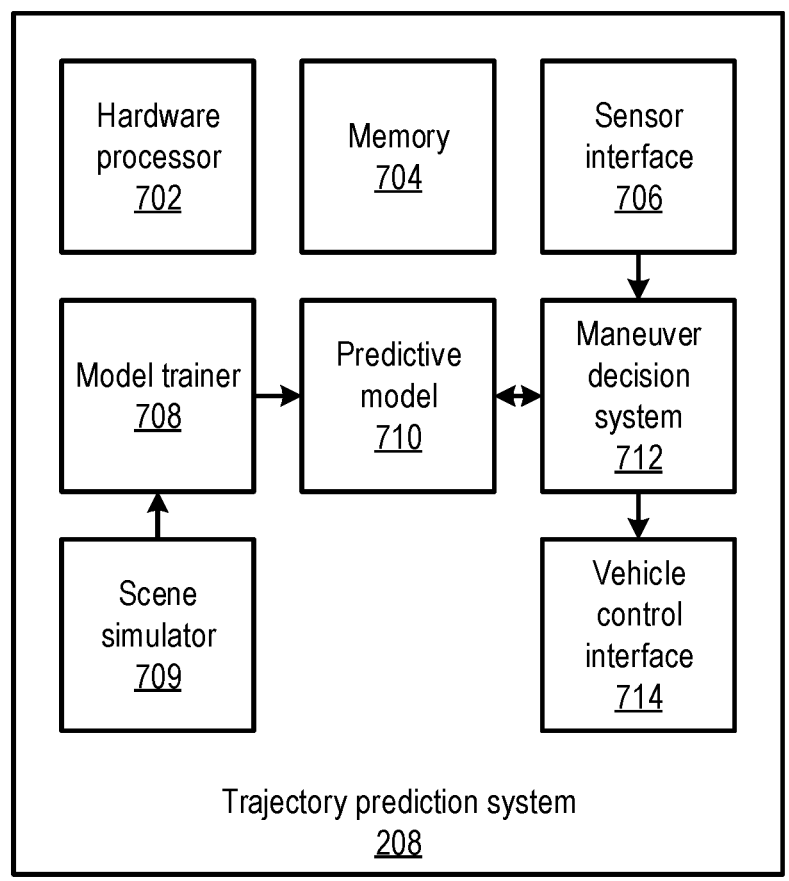
FIG. 7 is a block diagram of a trajectory prediction system for a self-driving vehicle, in accordance with an embodiment of the present invention.

Referring now to FIG. 7, additional detail on the trajectory prediction system 208 is shown. The system 208 may include a hardware processor 702 and a memory 704. The system 208 may further include a variety of functional modules, which may be implemented as software that is stored in the memory 704 and that is executed by the hardware processor 702 to perform their respective functions.

A sensor interface 706 receives information from the sensors 206. The sensor interface 706 may communicate with the sensors 206 by a dedicated interface, by a car-area network, or by any other appropriate wired or wireless communications medium and protocol. The sensor interface 706 provides sensor information regarding the scene around the decision-making vehicle 104 to a maneuver decision system 712.

The maneuver decision system 712 identifies a maneuver to perform, responsive to the detected scene. The sensor information is used as input to predictive model 710, which generates trajectories for detected vehicles 106 within the scene. The maneuver decision system 712 then makes a determination as to the best maneuver for the decision-making vehicle 104, and issues a command to a control system 210 through a vehicle control interface 714. The vehicle control interface 714 may communicate with the control system 210 using any appropriate wired or wireless communications medium or protocol, for example using a car area network.

The predictive model 710 is trained by model trainer 708. The model trainer 708 uses training data that may be generated by scene simulator 709, and may also use real-word training data. Although the model trainer 708 and the scene simulator 709 is shown as being part of the trajectory prediction system 208, these components may be implemented separately, with only a pre-trained predictive model 710 being implemented in the trajectory prediction system.

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained using a set of training data, with learning that involves adjustments to weights that exist between the neurons. An ANN is configured for a specific application, such as pattern recognition or data classification, through such a learning process.

Figure 8:
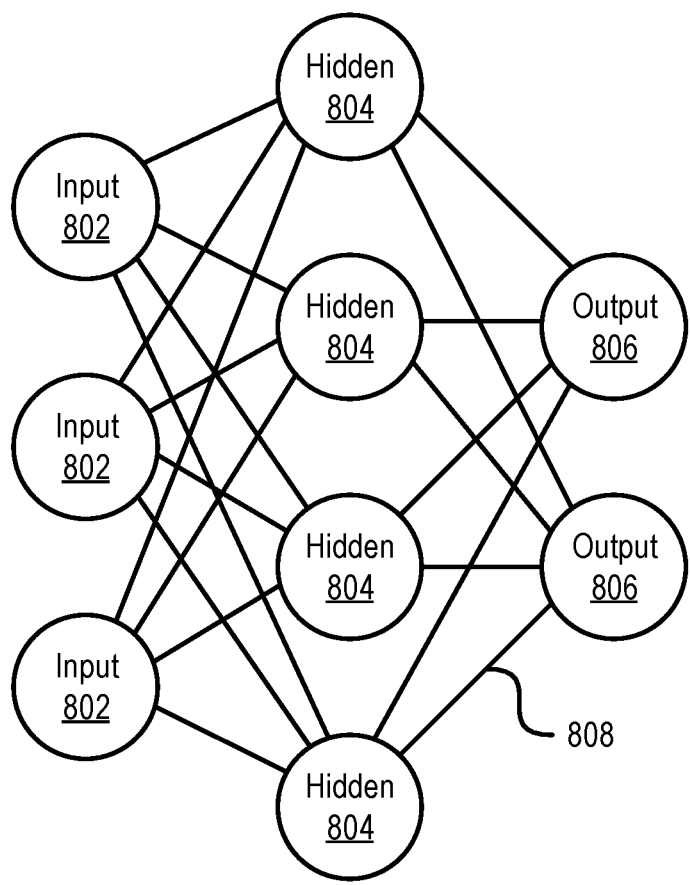
FIG. 8 is a diagram of an exemplary neural network architecture that may be used to implement a predictive model, in accordance with an embodiment of the present invention.

Referring now to FIG. 8, a generalized diagram of a neural network is shown. Although a specific structure of an ANN is shown, having three layers and a set number of fully connected neurons, it should be understood that this is intended solely for the purpose of illustration. In practice, the present embodiments may take any appropriate form, including any number of layers and any pattern or patterns of connections therebetween.

ANNs demonstrate an ability to derive meaning from complicated or imprecise data and can be used to extract patterns and detect trends that are too complex to be detected by humans or other computer-based systems. The structure of a neural network is known generally to have input neurons 802 that provide information to one or more "hidden" neurons 804. Connections 808 between the input neurons 802 and hidden neurons 804 are weighted, and these weighted inputs are then processed by the hidden neurons 804 according to some function in the hidden neurons 804. There can be any number of layers of hidden neurons 804, and as well as neurons that perform different functions. There exist different neural network structures as well, such as a convolutional neural network, a maxout network, etc., which may vary according to the structure and function of the hidden layers, as well as the pattern of weights between the layers. The individual layers may perform particular functions, and may include convolutional layers, pooling layers, fully connected layers, softmax layers, or any other appropriate type of neural network layer. Finally, a set of output neurons 806 accepts and processes weighted input from the last set of hidden neurons 804.

This represents a "feed-forward" computation, where information propagates from input neurons 802 to the output neurons 806. Upon completion of a feed-forward computation, the output is compared to a desired output available from training data. The error relative to the training data is then processed in "backpropagation" computation, where the hidden neurons 804 and input neurons 802 receive information regarding the error propagating backward from the output neurons 806. Once the backward error propagation has been completed, weight updates are performed, with the weighted connections 808 being updated to account for the received error. It should be noted that the three modes of operation, feed forward, back propagation, and weight update, do not overlap with one another. This represents just one variety of ANN computation, and that any appropriate form of computation may be used instead.

To train an ANN, training data can be divided into a training set and a testing set. The training data includes pairs of an input and a known output. During training, the inputs of the training set are fed into the ANN using feed-forward propagation. After each input, the output of the ANN is compared to the respective known output. Discrepancies between the output of the ANN and the known output that is associated with that particular input are used to generate an error value, which may be backpropagated through the ANN, after which the weight values of the ANN may be updated. This process continues until the pairs in the training set are exhausted.

After the training has been completed, the ANN may be tested against the testing set, to ensure that the training has not resulted in overfitting. If the ANN can generalize to new inputs, beyond those which it was already trained on, then it is ready for use. If the ANN does not accurately reproduce the known outputs of the testing set, then additional training data may be needed, or hyperparameters of the ANN may need to be adjusted.

ANNs may be implemented in software, hardware, or a combination of the two. For example, each weight 808 may be characterized as a weight value that is stored in a computer memory, and the activation function of each neuron may be implemented by a computer processor. The weight value may store any appropriate data value, such as a real number, a binary value, or a value selected from a fixed number of possibilities, that is multiplied against the relevant neuron outputs.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for training a trajectory prediction model, comprising:
    encoding a set of training data to generate encoded training vectors, where the training data includes trajectory information for road agents over time;
    simulating a plurality of simulated trajectory scenarios based on the encoded training vectors, each simulated trajectory scenario representing one or more road agents with respective road agent trajectories, including simulating accelerating and lane change decisions for the one or more road agents, to generate simulated training data, wherein lane change simulations include evaluating the following inequalities:

$$\tilde{a}_c - a_c + p\{(\tilde{a}_n - a_n) + (\tilde{a}_o - a_o)\} > \Delta a_{th} - \Delta a_{bias}$$

$$(\tilde{a}_n - a_n) > -b^n_{safe}, (\tilde{a}_c - a_c) > -b^c_{safe}$$

where a is a current acceleration, ã represents a new acceleration after lane change, p is a politeness factor, $\Delta a_{th}$ is a lane changing threshold, $b_{safe}$ is a deceleration, and $\Delta a_{bias}$ is a bias for a particular lane, and where subscripts/superscripts c, n, and o denote a current agent, new agents, and old agents, respectively; and
    training a predictive neural network model using the simulated training data to generate predicted trajectory scenarios based on a detected scene.

2. The method of claim 1, wherein the predictive neural network model includes an autoencoder section and a convolutional long-short term memory section with state pooling.

3. The method of claim 2, wherein state pooling pools previous state information from a final layer of the convolutional long-short term memory section for all of the one or more road agents and initializes a next state with the previous state information.

4. The method of claim 1, wherein at least one of the plurality of simulated trajectory scenarios includes multiple road agents.

5. The method of claim 4, wherein the predictive model generates the predicted trajectory scenarios for all of the multiple road agents in each simulated trajectory scenario at once.

6. The method of claim 1, wherein acceleration simulation may include generating an acceleration value as:

$$\left(1 - \left(\frac{v}{v_0}\right)^\delta - \left(\frac{s^*(v, \Delta v)}{s}\right)^2\right)$$

where s is a lead road agent of the one or more road agents, v is a velocity of a decision-making road agent, $\Delta v$ is a velocity difference between the lead road agent and the decision-making road agent, \delta is an exponent that influences how acceleration decreases with velocity, s is an actual distance between the lead road agent and the decision-making road agent, and s* is a minimum gap between the lead road agent and the decision-making road agent, and $v_r$ is a reference velocity.

* * * * *